United States Patent [19]
Espenan et al.

[11] Patent Number: 6,001,254
[45] Date of Patent: Dec. 14, 1999

[54] METHOD OF OPERATING AND MONITORING A GROUP OF FILTER MEMBRANE MODULES, AND A GROUP OF MODULES IMPLEMENTING THE METHOD

[75] Inventors: Jean-Michel Espenan, Enclos du Château; Franc Saux, Louis-Aragon, both of France

[73] Assignee: Aquasource, France

[21] Appl. No.: 08/930,803

[22] PCT Filed: Apr. 14, 1995

[86] PCT No.: PCT/FR95/00498

§ 371 Date: Dec. 8, 1997

§ 102(e) Date: Dec. 8, 1997

[87] PCT Pub. No.: WO96/32183

PCT Pub. Date: Oct. 17, 1996

[51] Int. Cl.$^6$ .................................................. B01D 61/00
[52] U.S. Cl. ...................... 210/636; 210/650; 210/257.2; 210/333.1; 210/333.01; 210/90
[58] Field of Search ................................ 210/650, 257.2, 210/333.1, 333.01, 636, 90, 195.2

[56] References Cited

U.S. PATENT DOCUMENTS

| | | | |
|---|---|---|---|
| 4,670,150 | 6/1987 | Hsiung et al. | 210/636 |
| 5,043,071 | 8/1991 | Anselme et al. | 210/636 |
| 5,262,053 | 11/1993 | Meier | 210/636 |
| 5,285,903 | 2/1994 | Sorenson et al. | 210/195.2 |
| 5,549,829 | 8/1996 | Le | 210/636 |

*Primary Examiner*—Ana Fortuna
*Attorney, Agent, or Firm*—Londa and Traub LLP

[57] ABSTRACT

A method of operating and monitoring a group of filter membrane modules connected in parallel and with the modules being periodically backwashed, in which:

- raw water to be treated is injected at a regulated pressure and the permeate outlet pressure is regulated to less than the inlet pressure;
- the group is provided with a water meter (60) on the raw water inlet duct and with three pressure sensors, one on the raw water inlet, one on the permeate outlet, and one on the backwash circuit, the meter and the sensors (100) delivering signals to a controller;
- each module is backwashed in succession with permeate from the other modules, with each module being individualized at that moment, thereby making it possible with aid of the water meter and of the pressure sensors to determine the permeability (150) in backwashing specific to the module as individualized in this way, and also to determine the production permeability of the remainder of the modules; and
- the values determined in this way are compared with reference values in order to modify the periodicity of backwashes and to proceed with module cleaning, and also to detect any anomaly in operation.

12 Claims, 1 Drawing Sheet

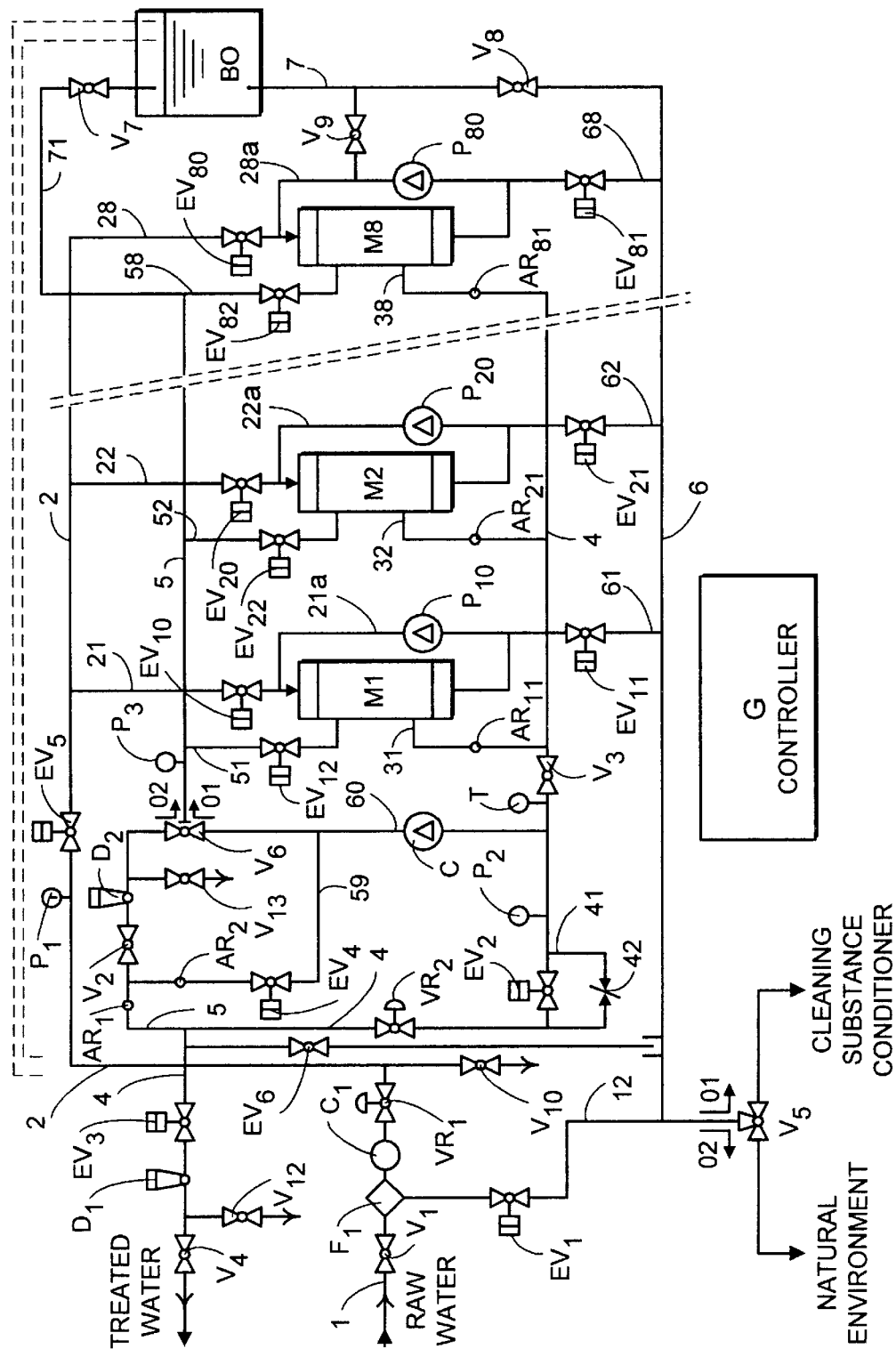

METHOD OF OPERATING AND MONITORING A GROUP OF FILTER MEMBRANE MODULES, AND A GROUP OF MODULES IMPLEMENTING THE METHOD

BACKGROUND OF THE INVENTION

The invention relates to a method of operating and monitoring a group of filter membrane modules, and also to a group of modules implementing the method, with a particular application to filtering water.

It has long been the practice to obtain potable water from natural waters (lakes, rivers) that are polluted to a greater or lesser extent, and to do so by means of installations that are fixed, given the techniques used. The recent appearance of filter membranes disposed in bundles within filter modules has made it possible to implement mobile installations suitable for taking action in the event of a fixed installation failing or in an emergency, e.g. when providing humanitarian aid.

Known mobile installations operate with pumps, including at least a booster pump and a pump for backwashing the membranes, which pumps consume a great deal of electricity. In some cases, installations are required to operate in areas without electricity so it is necessary to provide generator units and the fuel required to run them.

In addition, it is difficult to monitor the operation of filter modules, and if anomalies are observed to appear, it is very difficult or even impossible to find out the exact cause: excessive clogging, or membrane rupture in a module, and if so in which module, backwashing failure in a module, etc. . . .

Such installations usually operate on demand, i.e. they periodically stop production. When they are designed for temporary operation, they must also be capable of remaining unharmed during long periods of no operation. In both cases it is necessary to provide for the circuits to be chlorinated in order to avoid bacteria proliferating since that could damage the membranes or could be dangerous when the installation is put back into operation. Chlorination is performed by periodically injecting chlorinated water into the circuits by pumping.

In an emergency situation, the water to be treated may be unusually polluted and it is often necessary not only to perform periodic backwashing, but also to perform cleaning using appropriate cleaning substances. It is therefore necessary for the installation to be fitted with a cleaning circuit, and that requires a pump.

A water treatment assembly must therefore satisfy the following needs:

it must be compact, i.e. its volume must be small compared with its production capacity so as to facilitate transport thereof;

it must consume only a small amount of electricity, so it must have as few pumps as possible;

advantageously it should have a chlorination circuit and a cleaning circuit; and it should make it possible to diagnose possible operating anomalies and the state of the filter membranes, and to proceed with appropriate corrective action.

OBJECT AND SUMMARY OF THE INVENTION

The invention solves the problem by providing a method of operating and monitoring a group of filter membrane modules connected in parallel, in which method:

raw water to be treated is injected into the group of modules at a regulated pressure and the outlet pressure of the permeate (filtered water) is regulated to a value that is lower than that of the inlet pressure, but nevertheless sufficient to enable the filter membrane modules to be backwashed;

the group of modules is provided with a water meter on the raw water inlet duct and with three pressure sensors, a first on the raw water inlet, a second on the permeate outlet, and a third on the backwashing circuit, the meter and the sensors delivering signals to a controller;

the modules are backwashed successively one after another, using the permeate from the other modules, thereby individualizing each module while it is being backwashed, thus making it possible with the water meter and the pressure sensors to determine the permeability in backwashing specific to the module thus individualized, and also to determine the production permeability of the remaining modules; and the permeability values obtained in this way are compared with ideal values, with threshold values, and/or with values from earlier cycles so that, depending on the diagnosis obtained, the periodicity of backwashing is modified, the group of modules is cleaned, or an operating anomaly is detected, thereby enabling it to be corrected.

When there are provided both a chlorination circuit for periods when production is stopped and a circuit for cleaning the group of modules, then a common pump of low capacity, which therefore consumes little electricity, and situated in the permeate circuit serves to circulate the cleaning substance or the chlorinated water around each of the respective circuits.

Within the modules, filtering may be deadend filtering or cross-flow filtering. In deadend mode, the installation does not require recirculating pumps. Nevertheless, it is possible to operate in cross-flow mode with recirculating pumps, e.g. using one pump per module. By proceeding in this way, instead of in the conventional way which uses a single pump for recirculating water through all of the modules and the filter loop, the power required by the pumps is reduced and it is also possible to opt for periodic recirculation and to do so on one or more modules.

By injecting water under regulated pressure and by regulating the outlet pressure it is possible to backwash a module using water that has been filtered by the other modules, thereby eliminating the need for the permeate tank and the backwash pump that are normally associated with the installation. This saves space and energy consumption.

In addition, an advantageous consequence of washing each module in succession with water that has been filtered by the other modules, is that while a module is being subjected to backwashing, it is individualized, whereas during the remainder of the process, whether during production or backwashing of another module, the group of modules behaves as a whole. While a module is individualized, it is possible by means of the three pressure sensors and the water meter to determine permeability in backwashing $Lp_i$ specific thereto and also the mean permeability $LP_{n-i}$ of the remaining modules.

By performing this measurement module by module, the following are obtained:

$(Lp)_i$ in backwashing for each of the modules in succession; and $(Lp)_{n-i}$ in production for the set of modules minus the module that is being backwashed.

It is therefore possible by calculation to detect any abnormal operation module by module by comparing the permeability of each module with an ideal value, with a threshold value, or with a value taken from the preceding cycle or with the mean value of a plurality of preceding cycles. For comparison with ideal values or with threshold values, it is necessary to take account of the temperature of the water being filtered since permeability is a function of viscosity, so a thermometer is therefore provided in the permeate circuit. Except in the event of a sudden change, comparison is not performed immediately, but rather takes place after all of the modules have been subjected to backwashing.

Thus, for example, it is possible to detect the following:

excessive clogging which means that the set of modules must be cleaned, with the difference between permeability in filtering and permeability in backwashing also making it possible to select between available cleaning substances;

rupture of the filter membranes in a module, which means that the module must be taken out of operation and replaced; and abnormal operation of a valve.

For cleaning purposes, a circuit is provided that includes a pan for cleaning substance into which the operator places the appropriate substance which is selected as a function of the type of pollution to be treated and the state of the membranes, using techniques that are known in this respect. Cleaning takes place via the raw water circuit, with the cleaning substance diluted in raw water being filtered by the membranes which retain any solid impurities it may contain, which solid impurities therefore do not penetrate into the filtered water circuit. Circulation takes place by opening valves that give rise to a vacuum effect (of the trompe or liquid jet type) enabling driving power to be minimized and enabling cleaning substance to be sucked through the membranes by means of a "circulator" pump that consumes little energy. This pump is placed on the permeate circuit. After cleaning, the installation is emptied and rinsed one or more times. The water meter then serves to determine the quantity of water required for rinsing, depending on the cleaning substance used, i.e. the operator cannot stop rinsing until the quantity of raw water as previously set for the rinsing has been used.

During periods when production is stopped (not including backwashing), it is necessary to chlorinate the installation to avoid proliferation of bacteria which could damage the membranes and which could give rise to pollution of the treated water when the installation is put back into operation. Under such circumstances, water from the permeate circuit is circulated, being caused to pass through a chlorine dispenser, and using the above-mentioned circulator. Since the chlorine passes through the membranes, the entire installation is then treated. Chlorination is performed at the time production is stopped, and thereafter it is performed periodically, e.g. once every 3 hours while the installation is not in operation. The circulator is then used to cause the water to circulate for a determined length of time (a few minutes).

The various circuits are determined by opening and closing valves in a manner described in detail below with reference to a typical installation enabling the above-described method to be implemented.

The installation comprises a group of modules connected in parallel and fed with raw water via a common duct on which there are mounted a water meter, a regulator of the pressure downstream from the inlet pressure, and a pressure sensor. At the outlet from the modules, the permeate or treated water is collected in a common duct fitted with a pressure sensor and with a regulator of the pressure upstream from the outlet pressure. The duct is provided at its outlet with a chlorine dispenser for chlorinating the treated water, if necessary, which water is fed to the water mains either directly or else via a reserve cistern or a water tower.

The backwash circuit comprises a common duct feeding each module in succession with backwash water constituted by permeate delivered by the other modules. This is done by opening the valve in the backwash water inlet duct while the other valves in the other ducts are closed, and by opening a backwash water outlet duct that leads to a common drainage duct. The common backwash water feed duct is fitted with a pressure sensor. Backwash water is drained to a sewer or to the surrounding environment depending on availability. The backwash circuit passes via the chlorine dispenser of the permeate circuit if it is necessary to chlorinate the backwash water, with backwash chlorination making it possible, in known manner, to improve the effectiveness of backwashing. The pressure sensor on the backwash feed circuit co-operates with the water meter to determine the backwash permeability $Lp_i$ of the module that is being backwashed, and the pressure sensor of the permeate circuit co-operates with the water meter and the pressure sensor of the inlet circuit to determine production permeability $(Lp)_{n-i}$.

BRIEF DESCRIPTION OF THE DRAWINGS

Other characteristics and advantages of the method and the installation will appear on reading the following detailed description of the invention given below with reference to the accompanying drawing that shows the various operating circuits in an installation of the invention.

MORE DETAILED DESCRIPTION

The raw water feed duct 1 conveys water to be treated under pressure to the inlet valve $V_1$ of the installation. The inlet pressure is obtained either by a pump, or preferably in natural manner: a forced duct in a mountainous area; positioning the installation below a natural lake or dam; a water course having a high flow rate. An automatically-washed prefilter $F_1$ conveys the water to be treated to a water meter $C_1$, e.g. having a pulse-emitting head connected to a controller G (to simplify the diagram, controller connections to sensor members and to actuated members are not shown), and then through a downstream pressure regulator $VR_1$ where the pressure of the water is regulated to a constant inlet value, e.g. 3.2 bars. The water then passes into a common duct 2 which serves all of the filter modules $M_1$ to $M_n$ via a valve $EV_5$. In the example shown, n is equal to 8. In order to enable any module to be backwashed by the permeate from the other modules, it is necessary to have some minimum number of modules, generally four or five, in order to provide the necessary quantity of water. When a greater number of modules is used, then the quantity of water injected is reduced by the above-described system with a flow rate limiter member.

The controller may be replaced by a mere recorder leaving it up to the operator to calculate the permeability values and to perform the necessary comparisons. In the example shown, the controller receives signals, processes them, and compares them in application of appropriate software.

Each module ($M_1, \ldots, M_8$) is fed by a respective duct 21, . . . , 28 fitted with a respective valve $EV_{10}, \ldots, EV_{80}$. Each module permeate outlet duct 31, . . . , 38 fitted with a respective non-return valve $AR_1, \ldots, AR_8$ conveys permeate to a common duct 8 which is provided with a thermometer T, and an outlet valve $EV_3$ followed by a chlorine dispenser $D_1$ to chlorinate the treated water for distribution, depending on the requirements of the distribution mains. An upstream pressure regulator $VR_2$ regulates the outlet pressure to a value that is lower than the inlet pressure, e.g. to 2.5 bars.

Each duct 21, . . . , 28 has a branch 21a, . . . , 28a which serves, in deadend mode, to feed the modules with water to be treated or to drain backwashing water at both ends. This makes it possible to avoid a region with a high concentration of retained impurities being formed at the inlet to a module, and thus facilitates backwashing. Each branch connection may include a respective recirculating pump $P_{10}$, . . . , $P_{80}$, thereby making it possible to operate the modules in cross-flow mode should that be desired.

Prior to backwashing, the prefilter $F_1$ is washed, by means of a drain duct 12 provided with a valve $EV_1$.

For periodic backwashing, e.g. triggered once every 45 minutes, the valve $EV_{10}$ (the valve corresponding to the module being washed) is closed, as is the valve $EV_3$. The water filtered by the modules 2 to 8 thus passes via a duct 5 fitted with a chlorine dispenser $D_2$ and a three-port valve $V_6$ in position 02. For backwashing, each module is connected to the duct 5 via a respective duct 51, . . . , 58 provided with a respective valve $EV_{12}$, . . . , $EV_{82}$. While the module $M_1$ is being backwashed, the associated valve $EV_{12}$ is open, and the valves $EV_{22}$, . . . , $EV_{82}$ are closed. The water filtered by the modules $M_2$ to $M_8$ backwashes the module $M_1$ and it is drained into the common drain duct 6 via the duct 61 which is fitted with an (open) valve $EV_{11}$. The modules are washed in successive by opening and closing the corresponding valves as specified by the corresponding indices, with the backwash water being drained to the duct 6 via the ducts 62, . . . , 68.

The meter $C_1$ co-operates with the pressure sensors $P_1$ in the duct 2, $P_2$ in the duct 4, and $P_3$ in the duct 5, to measure the above-described permeabilities.

When the measurements performed during successive backwashes of the modules indicate that it is necessary to perform cleaning, then the installation is put into the stop position and the valves $V_1$ and $V_4$ are closed to isolate the raw water feed and the treated water tank. The cleaning substance pan BO is connected by a duct 7 having a valve V9 to the last filter module $M_8$. In a variant, the pan may be connected to one or more other modules or to all of the modules via the common duct 2. A duct 71 provided with a valve $V_7$ extracts some of the water circulating in the duct 5 to feed it to the cleaning substance pan BO. While the valve $V_6$ is in the cleaning position (arrow referenced 01 in the figure) opening the valves $V_7$ and $V_9$ and setting into motion the circulator C cause cleaning substance to be sucked progressively into the circuit, thereby cleaning the modules. Thereafter the installation is drained and rinsed one or more times prior to being put back into production. The duct is provided with a three-port valve $V_5$ draining either into the environment (position 02) or else into a cleaning substance recovery tank if the cleaning substance is unsuitable for the environment (position 01).

While the installation is waiting to start production, i.e. when the treated water tank outside the installation is full and there is no demand for water, the installation is subjected to periodic chlorination so as to avoid bacteria proliferating in the permeate circuit. To this end, the circulator C is put into operation with appropriate opening and closing of valves so that the water circulates along the ducts 4 and 5, passing through the modules, and also passing through the chlorine dispenser $D_2$, e.g. for a period of 2 to 4 minutes and with a periodicity of about once every 3 hours, for example.

In addition to the above-mentioned valves, the system also includes: a valve $EV_6$ used for drainage prior to the rinsing which is performed after cleaning; valves $V_{10}$ and $V_{12}$ for taking samples of raw water and of treated water respectively; and a valve $V_{13}$ for decompressing the chlorine dispenser $D_2$.

The permeate outlet duct 4 is fitted with a valve $EV_2$ associated with a parallel duct 41 that includes a flow rate limiter 42 enabling the installation at a limited flow rate. The installation attempts to run at high flow rate from time to time in order to determine whether the pollution peak has been exceeded. If it does not manage to run at high flow rate, an alarm is triggered to warn an operator that cleaning is necessary or that the installation must be stopped if the raw water resource turns out to be too polluted.

When a high level of pollution occurs on a temporary basis, the membranes clog quickly and their permeability decreases very quickly. In order to avoid overloading them, which could give rise to a complete stop in the production of filtered water, the installation operates at a low flow rate. When this low flow rate indication is observed by the meter $C_1$, the valve $EV_2$ closes and filtered water then passes through the flow rate limiter 42.

The following table summarizes the states of the various members during different operating stages of the installation.

| | Circulator C | Valves | | | | | | Module valves | | | | | | | | |
|---|---|---|---|---|---|---|---|---|---|---|---|---|---|---|---|---|
| | | $EV_1$ | $EV_2$ | $EV_3$ | $EV_4$ | $EV_5$ | $EV_6$ | $EV_{10}$ | $EV_{20}$ | $EV_{80}$ | $EV_{11}$ | $EV_{21}$ | $EV_{81}$ | $EV_{12}$ | $EV_{22}$ | $EV_{82}$ |
| Production | S | X | 0 | 0 | X | 0 | X | 0 | 0 | 0 | X | X | X | X | X | X |
| Limited prod. | S | X | X | 0 | X | 0 | X | 0 | 0 | 0 | X | X | X | X | X | X |
| Preferred BW | S | 0 | 0 | 0 | X | 0 | X | 0 | 0 | 0 | X | X | X | X | X | X |
| $M_1$ BW | S | X | 0 | X | X | 0 | X | X | 0 | 0 | 0 | X | X | 0 | X | X |
| $M_2$ BW | S | X | 0 | X | X | 0 | X | 0 | X | 0 | X | 0 | X | X | 0 | X |
| $M_8$ BW | S | X | 0 | X | X | 0 | X | 0 | 0 | X | X | X | 0 | X | X | 0 |
| Waiting to produce | | | | | | | | | | | | | | | | |
| Stopped | S | X | 0 | X | 0 | X | X | 0 | 0 | 0 | X | X | X | 0 | 0 | 0 |
| Chlorinating | Go | X | 0 | X | 0 | X | X | 0 | 0 | 0 | X | X | X | 0 | 0 | 0 |

-continued

| | Circulator C | Valves | | | | | | Module valves | | | | | | | | |
|---|---|---|---|---|---|---|---|---|---|---|---|---|---|---|---|---|
| | | $EV_1$ | $EV_2$ | $EV_3$ | $EV_4$ | $EV_5$ | $EV_6$ | $EV_{10}$ | $EV_{20}$ | $EV_{80}$ | $EV_{11}$ | $EV_{21}$ | $EV_{81}$ | $EV_{12}$ | $EV_{22}$ | $EV_{82}$ |
| Stopped | S | X | 0 | X | 0 | X | X | 0 | 0 | 0 | X | X | X | 0 | 0 | 0 |
| Cleaning or conditioning | Go | X | 0 | X | 0 | X | X | 0 | 0 | 0 | X | X | X | 0 | 0 | 0 |
| Draining | S | X | 0 | X | 0 | X | 0 | 0 | 0 | 0 | X | X | X | 0 | 0 | 0 |
| Rinsing 1 | S | X | 0 | 0 | X | 0 | 0 | 0 | 0 | 0 | X | X | X | X | X | X |
| Rinsing 2 | S | X | 0 | 0 | X | 0 | 0 | 0 | 0 | 0 | X | X | X | X | X | X |

| | Circulator C | Valves | | | | | | | | | | | | Non-return valves | | | |
|---|---|---|---|---|---|---|---|---|---|---|---|---|---|---|---|---|---|
| | | $V_1$ | $V_2$ | $V_3$ | $V_4$ | $V_5$ | $V_6$ | $V_7$ | $V_8$ | $V_9$ | $V_{10}$ | $V_{12}$ | $V_{13}$ | $AR_1$ | $AR_2$ | $AR_{11}$ | $AR_{21}$ | $AR_{81}$ |
| Production | S | 0 | 0 | 0 | 0 | 02 | 02 | X | X | X | X | X | X | X | X | 0 | 0 | 0 |
| Limited prod. | S | 0 | 0 | 0 | 0 | 02 | 02 | X | X | X | X | X | X | X | X | 0 | 0 | 0 |
| Preferred BW | S | 0 | 0 | 0 | 0 | 02 | 02 | X | X | X | X | X | X | X | X | 0 | 0 | 0 |
| $M_1$ BW | S | 0 | 0 | 0 | 0 | 02 | 02 | X | X | X | X | X | X | 0 | X | X | 0 | 0 |
| $M_2$ BW | S | 0 | 0 | 0 | 0 | 02 | 02 | X | X | X | X | X | X | 0 | X | 0 | X | 0 |
| $M_8$ BW | S | 0 | 0 | 0 | 0 | 02 | 02 | X | X | X | X | X | X | 0 | X | 0 | 0 | X |
| Waiting to produce | | | | | | | | | | | | | | | | | | |
| Stopped | S | 0 | 0 | 0 | 0 | 02 | 02 | X | X | X | X | X | X | X | X | X | X | X |
| Chlorinating | Go | 0 | 0 | 0 | 0 | 02 | 02 | X | X | X | X | X | X | 0 | 0 | 0 | 0 | 0 |
| Stopped | S | 0 | 0 | 0 | 0 | 02 | 02 | X | X | X | X | X | X | X | X | X | X | X |
| Cleaning or conditioning | Go | X | 0 | 0 | X | 01 | 01 | 0 | X | 0 | X | X | X | X | X | 0 | 0 | 0 |
| Draining | S | X | 0 | 0 | X | 01 | 01 | 0 | 0 | 0 | X | X | X | X | X | 0 | 0 | 0 |
| Rinsing 1 | S | 0 | 0 | 0 | X | 01 | 02 | X | X | X | X | X | X | X | X | 0 | 0 | 0 |
| Rinsing 2 | S | 0 | 0 | 0 | X | 02 | 02 | X | X | X | X | X | X | X | X | 0 | 0 | 0 |

Note: $V_5$ and $V_6$ are three-port valves.
S=stop.
O=open.
C=closed.

The non-return valves may be replaced by directly controlled valves, but they are cheaper.

It will be observed that the valves $EV_1$ to $EV_6$ and also the valves $EV_{10}$ to $EV_{80}$ enable raw water to penetrate into the modules $M_1$ to $M_8$. The valves $EV_{11}$ to $EV_{81}$ enabling raw water to leave the modules $M_1$ to $M_8$, and the valves $EV_{12}$ to $EV_{82}$ enabling backwashing water to enter the modules $M_1$ to $M_8$ are all automatic electrically-controlled valves. In another variant, all of the above-specified valves may be hydraulically- or pneumatically-controlled. The valves $V_1$ to $V_{13}$ may be manually-controlled valves, in which case the presence of an operator is essential for implementation of certain operating stages. It can be seen from the above table that the positions of these valves do not need to be modified except during cleaning and during the subsequent operations of draining and rinsing.

The valves $V_1$ to $V_9$ may also be controlled by the controller G when the controller serves not only to provide the permeability of each module directly during backwashing and the mean permeability of the other modules in production, but also serves to determine by calculation the permeability in production, and compares it with an ideal value, a threshold value, and/or the value obtained during the preceding cycle or the mean value as obtained during a plurality of preceding cycles, by running appropriate software. The valves $V_1$ to $V_9$ may be electrically-, hydraulically-, or pneumatically-controlled. Various types of control may be combined.

The valves $V_{10}$ and $V_{12}$ which are valves for taking samples respectively of raw water and of treated water are manual. $V_{13}$ is a valve for decompressing the chlorination system.

If the installation requires conditioning (treatment by means of a conditioner depending on treatment requirements), then the cleaning circuit is used for that purpose.

Depending on the chlorine requirements of the installation and on the local regulations concerning residual chlorine in the treated water, various types of chlorine dispenser may be used, but advantageously static dispensers will be used.

It is claimed:

1. A method of operating and monitoring a group of filter membrane modules connected in parallel with the modules being backwashed periodically, wherein:
   raw water to be treated is injected into the group of modules at a regulated pressure and the outlet pressure of the premeate (filtered water) is regulated to a value that is lower than that of the inlet pressure, but nevertheless sufficient to enable backwashing operations;
   the group of modules is provided with a water meter on the raw water inlet duct and with three pressure sensors, a first on the raw water inlet, a second on the permeate outlet, and a third on the backwashing circuit, the meter and the sensors delivering signals to a controller;

the modules are backwashed successively one after another, using the permeate from the other modules, thereby individualizing each module while it is being backwashed, thus making it possible with the water meter and the pressure sensors to determine the permeability in backwashing specific to the module thus individualized, and also determine the production permeability of the remaining modules; and the permeability values obtained in this way are compared with ideal values, with threshold values, and/or with values from earlier cycles so that, depending on the diagnosis obtained, the periodicity of backwashing is modified, the group of modules is cleaned, or an operating anomaly is detected, thereby enabling it to be corrected.

2. A method according to claim 1, wherein the group of modules is cleaned and the circuit is chlorinated during prolonged stops in production from the group of modules, a common pump on the permeate circuit providing circulation in the cleaning circuit or circulation in the chlorination circuit.

3. A method according to claim 2, wherein by setting into motion said common pump and opening valves of the cleaning circuit, a cleaning substance is caused to be sucked into the cleaning circuit and through the filter membranes.

4. A method according to claim 1, wherein the pressure signals and the meter signal are provided to an operator who calculates the permeabilities, compares them with specified reference values, and proceeds with cleaning when necessary.

5. A method according to claim 1, wherein the pressure sensors and the meter signal are delivered to a controller which includes a microprocessor whose software computes the permeabilities, compares them with specified reference values, and proceeds in automatic manner with cleaning when necessary.

6. A water treatment installation comprising a plurality of filter membrane modules ($M_1, \ldots, M_n$) connected in parallel, individual ducts (21, ..., 28) for feeding said modules, said individual ducts branching from a first common duct (1:2) fitted with a water meter ($C_1$), with a downstream pressure regulator ($VR_1$), and with an inlet pressure sensor ($P_1$), means for conveying the permeate from each module to a second common duct (4) fitted with an outlet pressure sensor ($P_2$) and with an upstream pressure regulator ($VR_2$);

a backwash circuit comprising a common backwash water feed duct (5) configured to feed each module ($M_i$) in succession with backwash water constituted by the permeate delivered by the other modules ($-M_i$), a valve ($EV_{11}$) of the backwash water inlet duct ($5_i$) configured to deliver said backwash water while the other valves ($EV_{1n}$) of the other duct ($5_n$) are closed, and an outlet duct ($6_i$) for backwash water leading to a common drain duct (6); and the common backwash water feed duct (5) is fitted with a pressure sensor ($P_3$), means for computing the permeability at each module based on data from the pressure sensors and the water meter, means for comparing the permeability with specified reference values to determine when cleaning is necessary, and means to effect cleaning of the individual modules by automatically operating said valves so as to direct backwash from the other modules through each module in succession.

7. An installation according to claim 6, wherein a cleaning circuit includes a cleaning substance pan (BO) connected by a duct (7) provided with a valve ($V_9$) for feeding raw water to at least one module and to the drain duct (6) via a valve ($V_8$), a duct (71) provided with a valve ($V_7$) for taking permeate from the common backwash water feed duct (5) and a chlorination circuit which includes a chlorine dispenser ($D_2$) on said common feed duct (5); a duct (60) fitted with a circulation pump (C) connecting the common backwash water feed duct (5) and the common permeate drain duct (4) in such a manner that the chlorination circuit and the cleaning circuit use the same circulation pump (C).

8. An installation according to claim 7, wherein opening the cleaning circuit valves ($V_7$, $V_9$) and putting the circulation pump (C) into operation give rise to cleaning substance being sucked from the cleaning substance pan (BO) and through the membranes of the modules ($M_1, \ldots, M_8$).

9. An installation according to claim 6, wherein each of the individual raw water feed ducts (21, ..., 28) for the modules ($M_1, \ldots, M_8$) include respective bypass branches (21a, ..., 28a) each connected to a second end of the corresponding module.

10. An installation according to claim 9, wherein said bypass branch ducts (21a, ..., 28a) are fitted with respective recirculating pumps ($P_{10}, \ldots, P_{80}$).

11. An installation according to claim 6, wherein the chlorine dispenser ($D_2$) of the chlorination circuit is a static chlorine dispenser.

12. An installation according to claim 6, wherein the valves are selected from manually-controlled valves, electrically-controlled valves, hydraulically-controlled valves, pneumatically-controlled valves, and combinations thereof.

* * * * *